United States Patent [19]

Higgins

[11] Patent Number: 5,376,766
[45] Date of Patent: Dec. 27, 1994

[54] WELD QUALITY MONITORING AND CONTROL SYSTEM FOR A TUBE MILL

[75] Inventor: Warren C. Higgins, Valley, Nebr.

[73] Assignee: Valmont Industries, Inc., Valley, Nebr.

[21] Appl. No.: 89,234

[22] Filed: Jul. 8, 1993

[51] Int. Cl.⁵ .............................................. B23K 11/25
[52] U.S. Cl. .................................. 219/61.5; 219/109
[58] Field of Search ....................... 219/109, 110, 61.5, 219/61.2

[56] References Cited

U.S. PATENT DOCUMENTS

| | | | |
|---|---|---|---|
| 2,309,343 | 1/1943 | Farrow | 29/33 |
| 3,042,788 | 7/1962 | Foster | 219/67 |
| 3,354,287 | 11/1967 | Sennello et al. | 219/110 |
| 3,573,416 | 9/1969 | Drechsler | 219/110 |
| 3,735,084 | 5/1973 | Urbanic et al. | 219/67 |
| 3,899,651 | 8/1975 | Bowman et al. | 219/67 |
| 4,012,619 | 3/1977 | Lifshits et al. | 219/101 |
| 4,144,440 | 3/1979 | Schalch et al. | 219/61.5 |
| 4,254,323 | 3/1981 | Takamatsu et al. | 219/110 |
| 4,287,402 | 9/1981 | Hentzschel et al. | 219/61.5 |
| 4,307,276 | 12/1981 | Kurata et al. | 219/10.41 |
| 4,443,677 | 4/1984 | DeSaw | 219/8.5 |
| 4,608,471 | 8/1986 | Vollmuth et al. | 219/8.5 |
| 4,621,176 | 11/1986 | Kliesch et al. | 219/61.5 |
| 4,636,608 | 1/1987 | Palentyn et al. | 219/121 LN |
| 4,708,390 | 11/1987 | Palentyn et al. | 296/188 |
| 5,223,683 | 6/1993 | Ishizaka | 219/110 |

Primary Examiner—Clifford C. Shaw
Attorney, Agent, or Firm—Zarley, McKee, Thomte, Voorhees & Sease

[57] ABSTRACT

A welded tube monitoring and control system includes a programmable logic controller (PLC) which receives data from a plurality of input apparatus which monitor the tube manufacturing process, and which generates output data to control various components of the tube manufacturing system. An apparatus for measuring the width of the flat metal strip prior to forming the tube transmits measurements to the PLC. The width of the strip is compared to a set of threshold parameters programmed in the PLC, and an alarm is triggered if the measured width exceeds these threshold parameters. A temperature measuring apparatus is located at the welding site to measure the temperature of the weld. The weld temperature is transmitted to the PLC and compared with a set of threshold parameters, and an alarm is triggered is the measured temperature exceeds the threshold parameters. An eddy-current testing apparatus is located downstream of the welding apparatus and transmits data to the PLC. The PLC compares the data from the eddy-current testing apparatus with a set of threshold parameters, and triggers an alarm if the measured data exceeds the threshold parameters. The PLC is connected to the drive for the mill, so as to shut down the manufacturing process if an alarm continues for a predetermined length of time. An override switch is provided so as to override the alarm to prevent the shut down of the mill.

21 Claims, 8 Drawing Sheets

WELD QUALITY MONITORING AND CONTROL SYSTEM FOR A TUBE MILL

BACKGROUND OF THE INVENTION

1. Field of the Invention

This invention relates to a monitoring system for a tube mill and more particularly to a monitoring system which ensures that the tubes formed in the tube mill will not have any weld defects therein.

2. Description of the Related Art

Tube mills have been utilized for many years for producing welded steel tubing. Welded steel tubing is fabricated from flat rolled steel strip received in coils from the steel mill.

The tube mill specifies thickness, width, chemical analysis and mechanical properties to ensure the production of tubing which meets mill quality standards and those of its customers.

Wide steel coils are slit to very accurate width, which is determined by as-welded tube size. Steel for making welded tubing is available either cold rolled or hot rolled.

Normally, welded steel tubing is formed, welded, sized and cut on one machine. The flat steel is normally passed through consecutive paired contoured rolls which gradually form the cold steel into a tubular shape. It then enters the welding unit where the butted edges are joined by one of several methods. Accurate and proper contact with the steel's edges is important in this operation.

Electric resistance welding (ERW) is the normal procedure for manufacturing carbon steel tubing, as well as many alloy steels. In ERW, the heat for welding the butted edges together is generated by the resistance of the steel to the flow of an electric current. The heat is confined to a narrow band along the edges with the highest temperature at the extreme edges.

In one form of ERW, a high frequency current is conducted to the strip edges by an induction coil. In the embodiment of the present invention, the induction coil is circumferential, and makes no direct contact with the tubing. The high frequency current is passed through the coil and sufficient energy is induced in the tubing to bring the butted edges to welding temperature. A set of rolls squeeze the butted edges together while they are at welding temperature to complete the weld. No extraneous metal is added during such a welding operation.

The electric resistance welding procedure extrudes a small amount of metal (weld flash) on both the inside and outside of the tubing. It does not affect the properties of the tubing, because it is solid metal. This weld flash is removed from the outside diameter with a cutting or planing tool in order to keep the outside diameter uniform. The tool is positioned on the welding machine immediately after the welding unit.

In order to create uniform weld along the tubing, the welding temperature should be maintained within a specific range for the specific type of material. In addition, appropriate pressure on the steel strips edges is required to maintain the accurate and proper contact during the welding process for uniform welds.

After being welded, the tubing enters the sizing section of the process, wherein a set of opposing pairs of rolls will size and form the tube into the desired configuration. The tubing is then advanced to a cut off mechanism, wherein the desired length of tube is cut off "on the fly".

Heretofore, when defects were discovered in the finished product, those defective sections were cut from the tube. However, in the past, even with the methods of testing which have been employed, defective tubing could be shipped from the tube mill.

In the prior art, random portions of tubing were selected for destructive testing procedures. For example, in a flattening test, a force is applied to the tubing surface at right angles to its axis. The weld is positioned at 90° or 0° to the applied force, in order to check the weld quality. A crushing test is applied to short lengths of tubing, and results in a fold which stretches the outside fibers at the surface. Flare and flange tests utilize short lengths of tubing which are forced over a cone having an angle of about 60°. A flange is produced when the tubing is flared over the cone and then placed on a flat surface under increased load. This is the most common test, because it stretches the tubing, including the weld, to the extent desired and will eventually cause the metal to fail. Preferably, the metal of the tubing will fail before the metal in the weld portion of the flare.

In recent years, steel tubing has been utilized in the production of door beams for vehicles. For example, see U.S. Pat. No. 4,636,608 which discloses an apparatus for cutting the ends of the tubes or pipes so that they may be positioned in the door of a vehicle. Since the door beams are being utilized as a safety feature in the vehicle, it is imperative that the beams employed therein be completely free from any weld defects which could affect their performance in the event of a collision. Heretofore, it was not possible to be able to ensure that the steel tubes being supplied for the door beams were completely free of defects which could affect their performance in a crash.

SUMMARY OF THE INVENTION

It is therefore a general object of the present invention to provide a monitoring and control system for manufacturing welded tube which continuously monitors and controls various facets of the manufacturing process to ensure that the tubing welded seam is flawless on shipped products.

Another object of the present invention is to provide a monitoring system for tubing welds which compares a variety of continuously monitored factors in determining the quality of a weld.

Still another object of the present invention is to provide a monitoring system for tubing welds which automatically shuts down the welding process when at least one of several measured factors falls outside of the range of measured parameters.

Yet another object is to provide a monitoring system for tubing welds which permits a manual override of the automatic shut down process by an operator.

These and other objects will be apparent to those skilled in the art.

The monitoring and control system of the present invention is designed to continuously monitor the quality of a weld in welded steel tubing, and includes a programmable logic controller which receives data from a plurality of input apparatus which monitor the tube manufacturing process, and which generates output data to control various components of the tube manufacturing system. One data input device utilized in the monitoring system is an apparatus for measuring the width of the flat metal strip prior to forming the tube.

The width of the strip is compared to a set of threshold parameters programmed in the PLC, and an alarm is triggered if the measured width exceeds these threshold parameters. A temperature measuring apparatus is located at the welding site to measure the temperature of the weld. The weld temperature is transmitted to the PLC and compared with a set of threshold parameters, and an alarm is triggered if the measured temperature exceeds the threshold parameters. An eddy-current testing apparatus is located downstream of the welding apparatus and transmits data to the PLC. The PLC compares the data from the eddy-current testing apparatus with a set of threshold parameters, and triggers an alarm if the measured data exceeds the threshold parameters. The PLC is connected to the drive for the mill, so as to shut down the manufacturing process if an alarm continues for a predetermined length of time. An override switch is provided so as to override the alarm to prevent the shut down of the mill, in the event that the "out-of-tolerance" condition does not affect the weld quality. A linear encoder tracks the movement of the tube, and provides information to the PLC to permit marking of "out-of-tolerance" conditions which exist along the tube. The PLC is connected to the mill cut off apparatus as well as the mill dump table, so as to direct the cut off apparatus to cut out the "out-of-tolerance" sections of pipe, and to dump the unacceptable portions to a rack separate from the rack which contains good products.

DESCRIPTION OF THE PREFERRED EMBODIMENT

Figure 1:
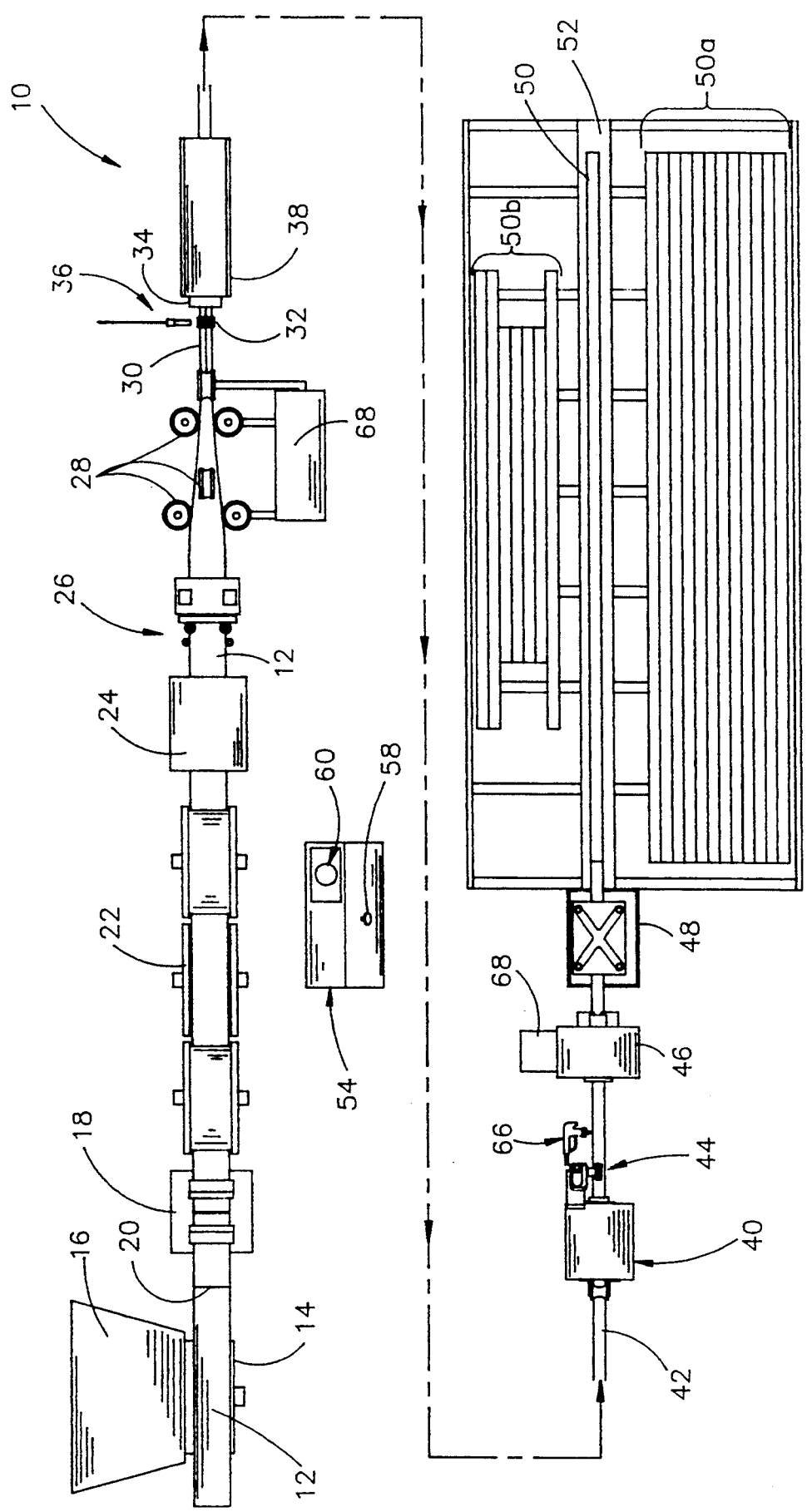
FIG. 1 is a top plan view of a conventional tube mill with the monitoring system of the present invention installed thereon.

Referring now to the drawings, in which similar or corresponding parts are identified with the same reference numeral, and more particularly to FIG. 1, a floor plan of a conventional tube mill is shown with the monitoring system of the present invention incorporated thereon.

As discussed in the background of the invention, flat rolled steel is received in the form of coiled sheets which are sheared or slit to a predetermined width to form a particular diameter tube. In FIG. 1, a sheet steel strip 12 on a coil 14 is continuously removed from coil 14 by an operable reel 16. A welding apparatus 18 will weld the transverse end 20 of one coil strip 12 to the end of a previous coil strip, so as to form a continuous sheet steel strip moving through the tube mill.

A loop of the steel strip 12 is formed over a set of pulleys 22 of an accumulator 24 during the welding of the strip end 20, to permit continuous operation of the mill, while allowing the strip end 20 to be stationary while on welding apparatus 18. Once welding apparatus 18 has completed the welding procedure, pulleys 22 are operated to accumulate additional sheet strip material so that the end welding procedure may once again be performed.

The first input device of the monitoring system 10 is an optical micrometer 26, located downstream of welding apparatus 18 and upstream of forming rolls 28. Optical micrometer 26 is shown in more detail in FIG. 3, and serves to measure the width of strip 12 immediately prior to forming and welding into a tube.

Figure 4:
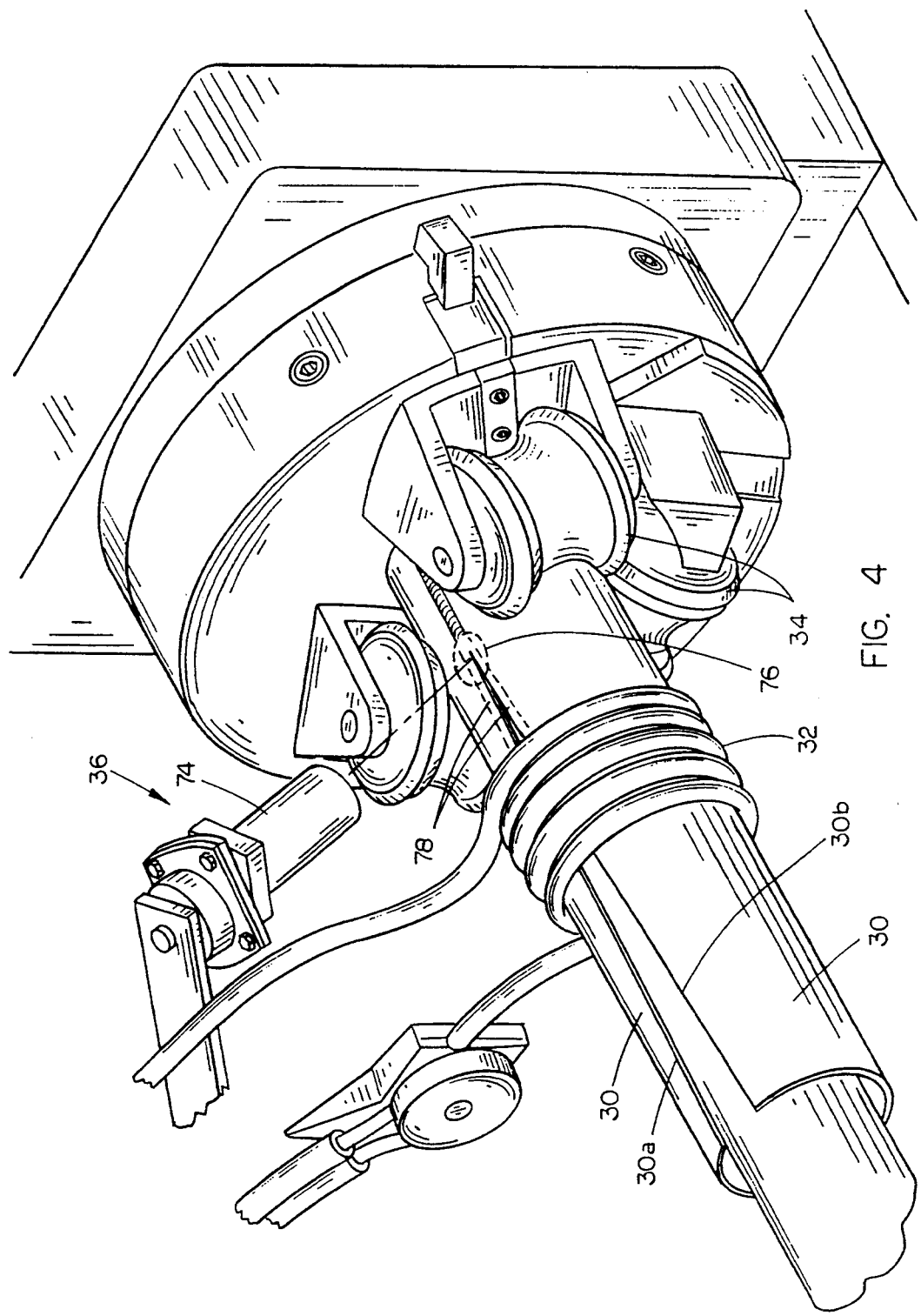
FIG. 4 is a perspective view of the welding portion of the tube mill with an optical pyrometer of the monitoring system installed thereon.

Referring again to FIG. 1, steel strip 12 is passed through consecutive paired contoured rolls 28 which gradually form strip 12 into an open seam tube, designated by reference numeral 30 in FIGS. 1 and 4.

The tube mill disclosed in the present application utilizes an electric resistance welding (ERW) process to weld the tube. More particularly, an induction tube welding process is specifically disclosed herein. The induction tube welding process utilizes an inductor or work coil 32 circumferentially surrounding open seam tube 30 to induce a current to flow in the tube around its circumference. The tube is closed by a plurality of closing rolls 34, as shown in FIG. 4. The second input device of monitoring system 10 is an optical pyrometer 36, and is located downstream of work coil 32 at the induction weld site. Optical pyrometer 36 "reads" the color of the weld, so as to determine the temperature of the weld.

Downstream of the ERW apparatus 38, a nondestructive electric testing apparatus (eddy-current). It is positioned in such that the welded tube, designated as 42, passes therethrough, as shown in FIG. 1. Eddy-current apparatus 40 detects discontinuities in welded tube 42 by the application of a concentrated, strong magnetic field, which induces corresponding currents (eddy-currents) to flow in welded tube 42. A sensor coil detects the resultant electromagnetic flux related to these currents. The presence of discontinuities in the welded tube 42, and specifically along the weld, will alter the normal flow of currents, which is detected by the sensing coil. Eddy-current apparatus 40 thus forms the third input device of monitoring system 10.

A linear encoder 44 is located immediately downstream of Eddy-current apparatus 40 and serves as a fourth input device for monitoring system 10. Linear encoder 44 generates signals so as to label and trace welded tube 42. As discussed hereinbelow, the input data from linear encoder 44 is required for output responses that categorize the product as "acceptable" or "unacceptable".

After leaving linear encoder 44, welded tube 42 passes through a finishing station 46 which forms the tube into the desired finished shape and dimensions.

A cut off apparatus 48 is located downstream of finishing station 46, which cuts the welded tube to the desired length. The cut off tube, designated at 50, advances to a dump table 52 where acceptable tubes 50a are accumulated along one side, and unacceptable tubes 50b are accumulated on opposing side.

A central control terminal 54 is shown in FIG. 1, and includes a programmable logic controller (PLC) therein which accepts data input from optical micrometer 26, optical pyrometer 36, eddy-current apparatus 40 and linear encoder 44. A palm switch 58, described in more detail hereinbelow, is operably mounted on control terminal 54, and provides a fifth source of input data to the PLC. The PLC utilizes programmable logic to generate outputs to various apparatus of the tube mill. Although not shown in FIG. 1, control terminal 54 and the PLC therein are electrically connected to the inputs and outputs described herein.

One apparatus which receives output data generated by the PLC, is an audio visual alarm designated generally at 60 in FIG. 1, and preferably located on the control terminal 54.

Figure 7:
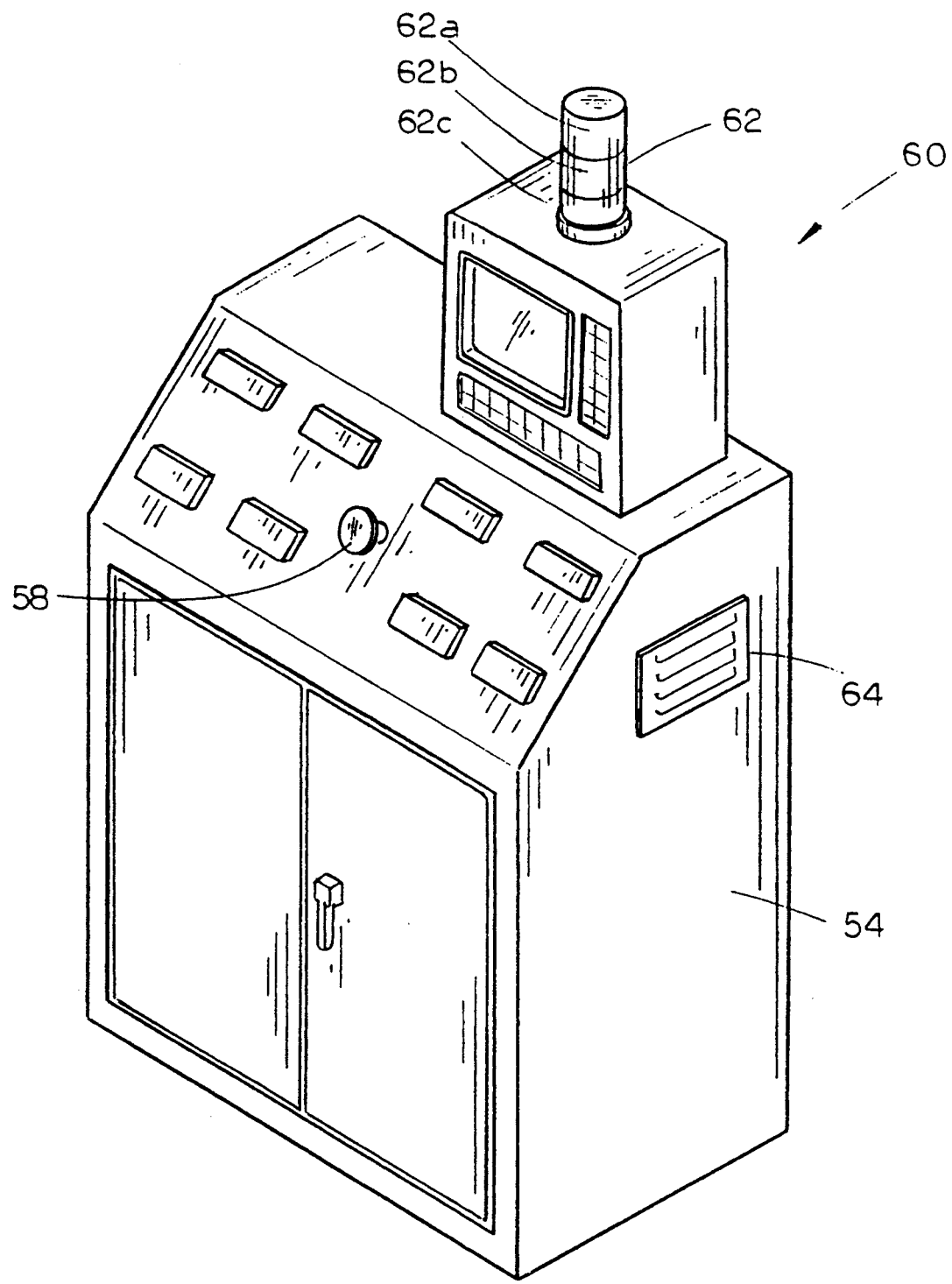
FIG. 7 is a perspective view of a control terminal utilized in the monitoring system of the present invention.

Referring now to FIG. 7, audio visual alarm 60 includes a light tower 62 and an audio speaker 64, mounted on control terminal 54. Light tower 62 preferably includes three separate, vertically spaced warning lights 62a, 62b and 62c. Although alarm 60 is shown on control terminal 54, similar alarms would preferably be placed at various strategic locations along the tube mill manufacturing line for appropriate operator response. In the present invention, warning light 62a will be activated when optical micrometer 26 detects an "unacceptable" monitored parameter. Warning light 62b will flash when optical pyrometer 36 detects an "unacceptable" monitored parameter. Finally, warning light 62c will be activated upon detection of an "unacceptable" monitored parameter by eddy-current apparatus 40. In this way, the specific parameter which is unacceptable can be immediately identified merely by viewing light tower 62.

The PLC is also programmed to detect "trends" prior to reaching an actual "unacceptable" threshold. Thus, if one of the three input devices 26, 36 or 40 monitors a parameter which is near the out of tolerance range, the PLC will trigger the associated warning light 62a, 62b or 62c in a flashing condition. In addition, audio speaker 64 will be triggered so as to indicate that at least one of the warning lights of light tower 62 is flashing. Once the threshold parameter of the particular input device is exceeded, the PLC is programmed to generate a constant (nonflashing) warning light in light tower 62, along with audio speaker alarm 64.

The PLC also generates output data which is transmitted to a marking system 66, located downstream of linear encoder 44. Marking system 66 visually marks welded tube 44 to identify portions which have been determined to be "unacceptable".

The mill cut off apparatus 48 is also connected to the PLC, and cuts those sections of pipe which contain "unacceptable" portions. The PLC logic optimizes scrap into the least number of pieces, and directs mill cut off apparatus 48 to cut "unacceptable" portions to lengths different than the desired end-product length or "prime" length. This serves as an additional visual indicator that a length of tubing is either "acceptable" or not, without regard to any other indicator on the tubing.

Dump table 52 also serves as an output device of the monitoring system, and is connected to the PLC. Output data from the PLC will direct dump table 52 to transfer material in one direction if determined to be "acceptable", and to dump tubing in an opposite direction if it is determined to be "unacceptable".

A fifth output device connected to the PLC includes the drive units 68, generally referred to as the mill drive 68. The mill drive supplies power to convert flat steel strip to round tubing into primary areas: the forming section characterized by forming rolls 28, and the sizing section characterized by finishing station 46. The PLC will have the capability to shut down the mill drive if "unacceptable" characteristics continue for a predetermined period of time.

The ERW apparatus is also connected to the PLC and will receive output data from the PLC. The PLC will have the capability to shut down the high frequency welder of the ERW apparatus by generating appropriate output data in response to "unacceptable" characteristics from one or more of the input devices.

Finally, long term data shortage and recording may be accomplished by down loading data from the PLC and control terminal 54 to an industrial personal computer (not shown). Such data storage would serve as a seventh output data receiver connected to the PLC.

Figure 8:
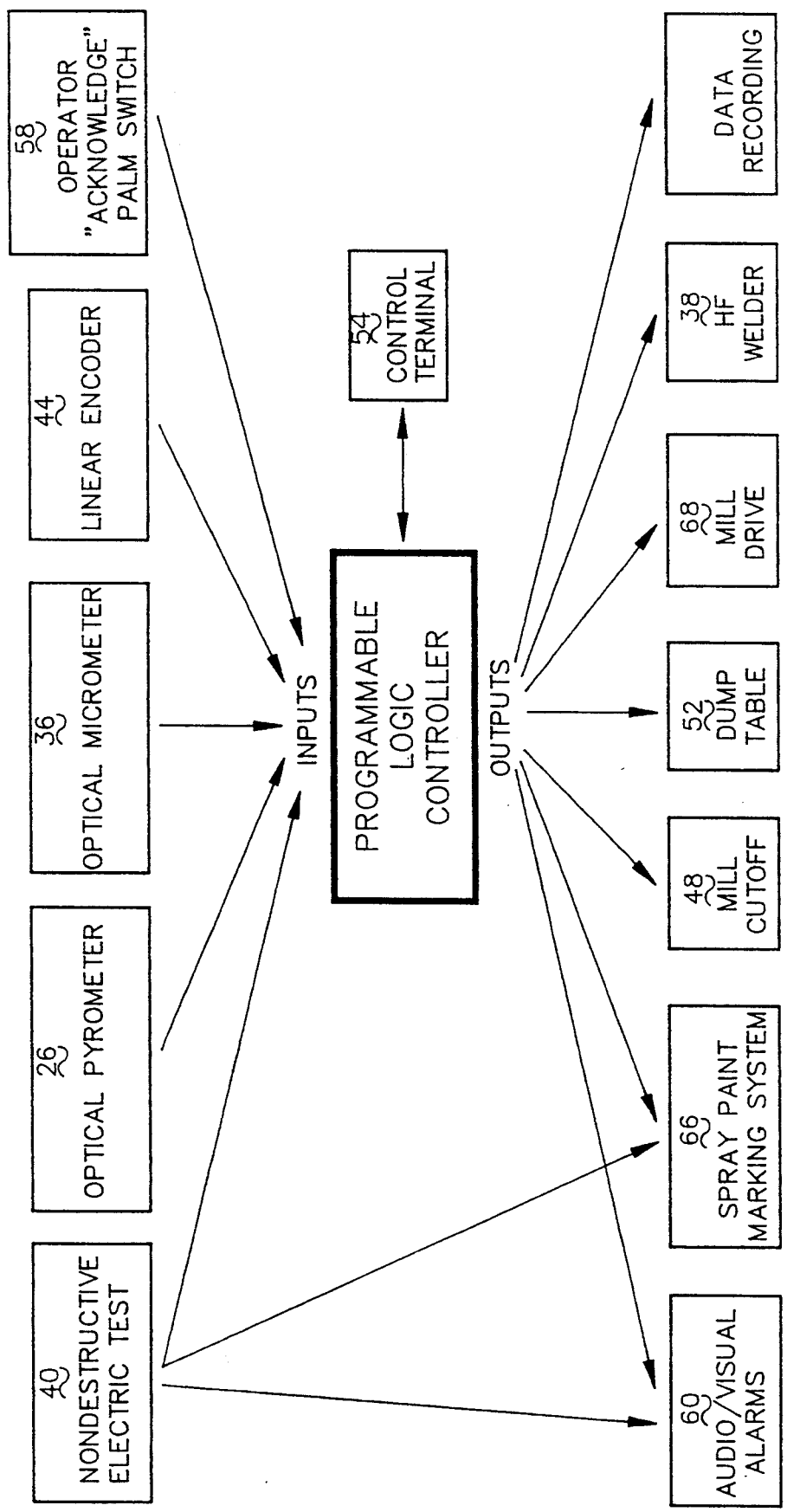
FIG. 8 is a block diagram of the monitoring system of the present invention.

FIG. 8 is a block diagram which shows the relationships between the various inputs and outputs with the PLC.

As described above, monitoring system 10 is mounted to a tube mill for the purpose of monitoring critical weld parameters, and taking action in response to measured conditions which fall outside of the range of acceptable parameters. A programmable logic controller, in conjunction with an industrial terminal, is designed for set up and monitoring of the system, and receives all input data and transmits outputs in response thereto.

Figure 2:
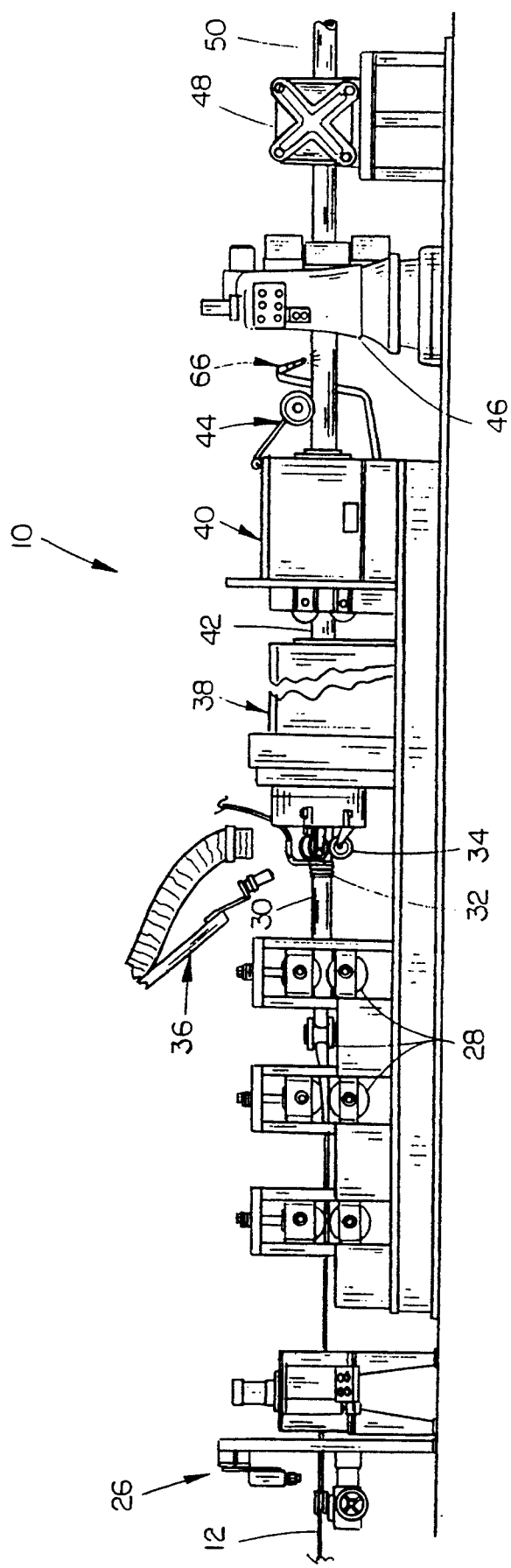
FIG. 2 is a front elevational view of portions of the tube mill shown in FIG. 1, which includes the monitoring system of the present invention.
Figure 3:
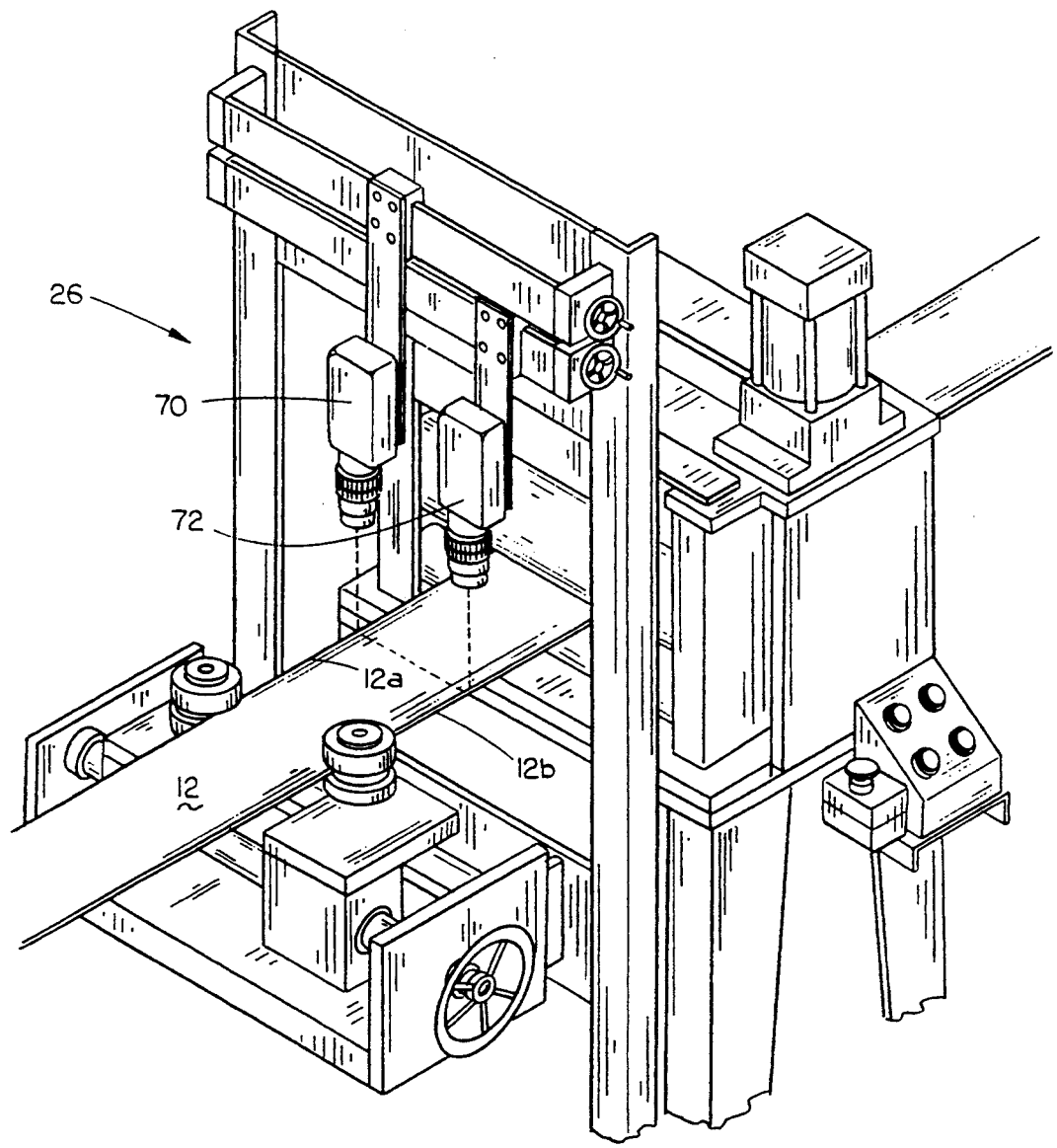
FIG. 3 As a perspective view of the optical micrometer portion of the monitoring system of the present invention.

As shown in FIGS. 2 and 3, the first input device of monitoring system 10 is the optical micrometer 26. Optical micrometer 26 includes a pair of optical linear sensors 70 and 72 which are focused on the edges 12a and 12b of strip 12, as shown in FIG. 3. Data from sensors 70 and 72 is combined so as to continuously measure the exact width of strip 12. Because the tube is welded by forming the strip into a tube shape and welding the abutting edges 12a and 12b, the width of the strip directly relates to welding pressure. Because pressure is metallurgically fundamental to this welding process, the exact width of the strip 12 must be maintained. In fact, one common defect which occurs during slitting of a coil, is that the width of the slit strip is too narrow for a reliable, high-quality weld. An acceptable variation of the strip width range may be set at control terminal 54 so as to provide a set of parameters indicating an "unacceptable" condition. Weld pressure is correct if the material width is within the specified tolerances, and the equipment and tooling is maintained to industry standards.

The optical pyrometer 36 is the next downstream input device which is connected to the PLC. As shown in FIG. 4, optical pyrometer 36 includes a sensor 74 which is targeted (as indicated by broken line circle 76) on the weld area located between closing rolls 34. Work coil 32 heats the edges 30a and 30b of open seam tube 30 to a temperature which causes the steel to change color. This heated glowing area is indicated generally at 78 along each edge 30a and 30b. Sensor 74 "reads" the color of the material at the weld and compares it to a reference or standard as an indirect indication of the temperature of the weld site.

Modern day sensors utilize two color technology for improved consistency and accuracy in industrial environments where smoke, water, steam, etc. may momentarily obscure the light path. The range of acceptable trends and acceptable thresholds may be set at the control terminal, and a continuous measurement of the temperature is transmitted from sensor 74 to the PLC at the control terminal. Appropriate alarms are activated when the temperature of the weld falls either within the trend lines or beyond the threshold parameters.

Figure 5:
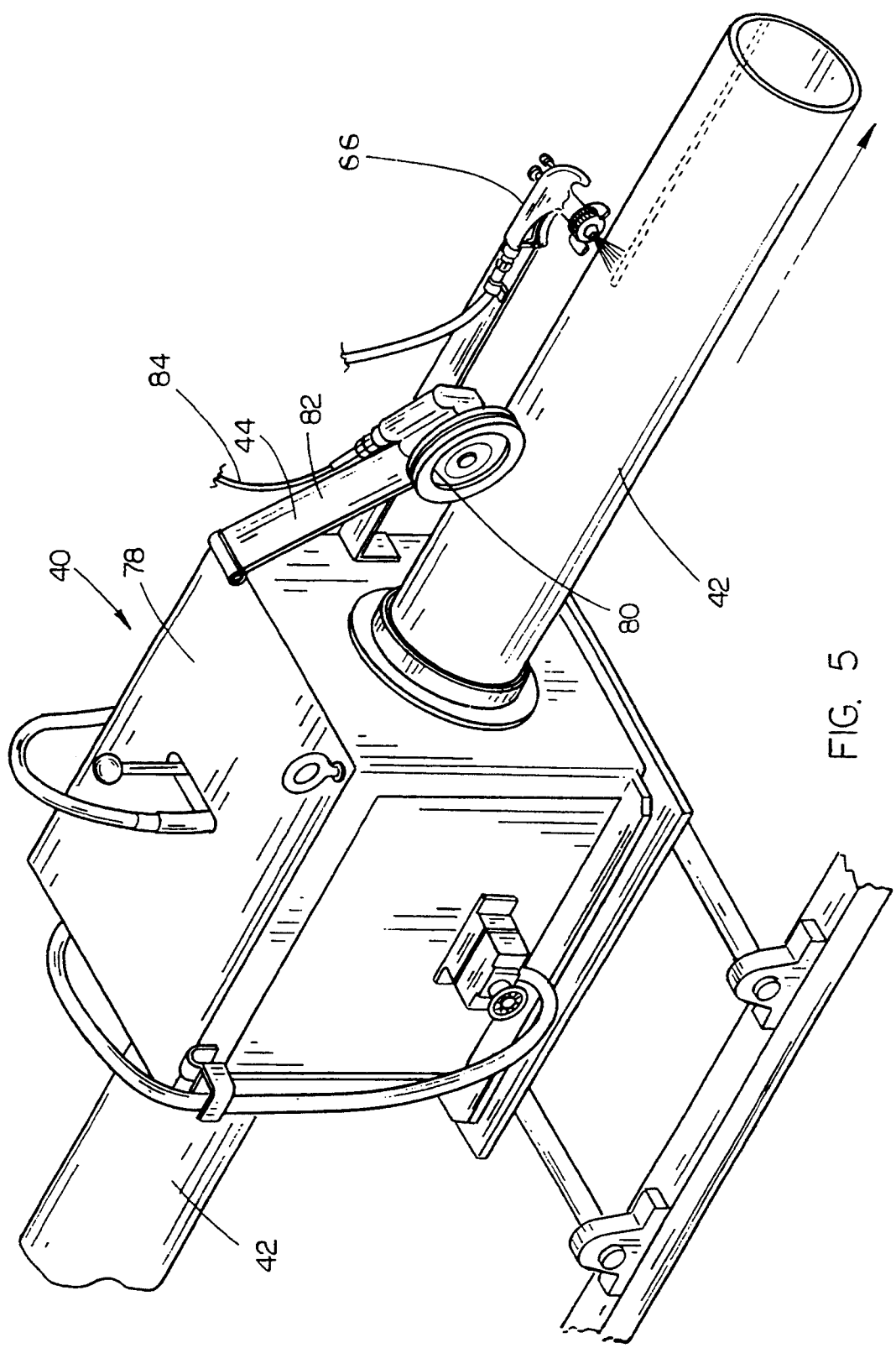
FIG. 5 is a perspective view of the apparatus for conducting a nondestructive electric test of the present invention, with a linear encoder and marking system shown adjacent thereto.

The third input device is the eddy-current apparatus 40, shown in FIG. 5. A housing 78 receives welded tube 42 therethrough and provides a strong magnetic field which is utilized in combination with a sensor coil or probe so as to detect changes in conductance, magnetic permeability, and dimension/mass. Because flaws within the body and/or weld of a tube change the conductance of the material, the eddy-current apparatus 40 can detect "unacceptable" characteristics in the tube and/or weld. As with the prior input apparatus, the eddy-current apparatus 40 has parameters that may be set at control terminal 44, and transmits the results of the test to the PLC for generating appropriate outputs.

Continuing to refer to FIG. 5, linear encoder 44 generates signals that become inputs to the PLC for tracking. As shown in FIG. 5, linear encoder 44 includes a rotatable wheel 80 engaged to rotate as welded tube 42 moves downstream. A cable 84 transmits information from wheel 80 to the PLC.

The final input device is the palm switch 58 operably mounted on control terminal 54, as shown in FIGS. 1 and 7. Palm switch 58 is a momentary push button which is utilized to acknowledge an out-of-tolerance condition in a normal situation (i.e. coil-to-coil butt joints). As noted above, optical micrometer 26, optical pyrometer 36 and eddy-current apparatus 40 will transmit information to the PLC indicating an "out-of-tolerance" condition. The system has a "shut down" capability if out-of-tolerance conditions go uncorrected or "unacknowledged". Since various periods of out-of-tolerance conditions are a normal part of the tube making process, a shut down during "normal" instances would belabor the condition and decrease productivity. Palm switch 58 is connected to the PLC, and provides an operator "override" which acknowledges the out-of-tolerance condition to the PLC, and instructs the PLC to ignore that condition. If the palm switch is not activated by an operator within a predetermined period of time, the PLC will shut down the tube mill process, so as to avoid out of tolerance conditions which would generate large amounts of scrap material and "unacceptable" tubing.

As discussed hereinabove, marking system 66 is designed to visually mark "unacceptable" portions of tubing so that they are readily identifiable to all operators for ultimate sorting and rejection. FIG. 5 shows marking system 66, which includes a nozzle 86 supported on a support arm 88 and directed towards welded tube 42. A conduit 90 connects nozzle 86 to a source of paint or other visual marking material which is sprayed on welded tube 42. The PLC generates an output in response to data from the input devices, so as to activate nozzle 86 to spray paint onto the welded tube at a portion which is "unacceptable". Although not shown in the drawings, it is foreseen that additional nozzles may be connected to the marking system 66 so as to provide a different color paint based upon the specific characteristic which is "unacceptable".

Figure 6:
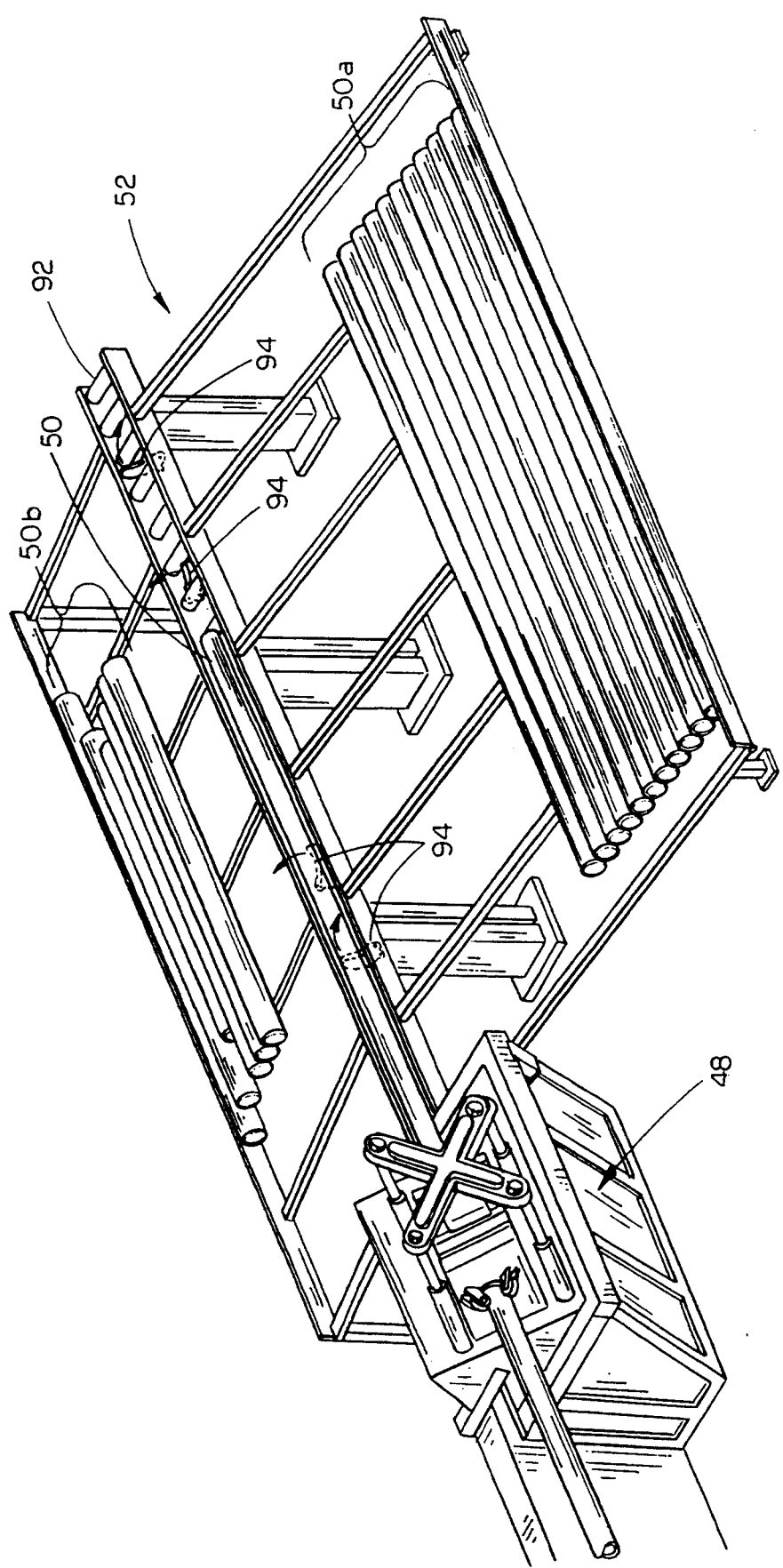
FIG. 6 is a perspective view of the tube mill cut off and associated dump table.

Referring now to FIG. 6, the mill cut off apparatus 48 is connected to the PLC and will cut off portions of tubing which are determined to be "unacceptable". Cut off tubes 50 are forwarded along a conveyor 92 to dump table 52 wherein a plurality of operable arms 94 may be activated to dump acceptable tubes 50a in one direction, while dumping unacceptable tubes 50b, in an opposite direction. Dump table 52, and particularly operable arms 94, are connected to the PLC to determine the appropriate direction for dumping of cut off tubes 50. Since "unacceptable" tubes will never be cut to "prime" length, the finished tube length will serve as an additional visual indicator of "acceptability".

Whereas the invention has been shown and described in connection with the preferred embodiment thereof, it will be understood that many modifications, substitutions, and additions may be made which are within the intended broad scope of the appended claims. There has therefore been shown and described an improved monitoring system for a tube mill which accomplishes at least all of the above stated objects.

I claim:

1. A monitoring and control system for a tube mill capable of converting a flat metal strip to round tubing, said tube mill including a forming section which forms the flat strip into an open seam tube, a welding section for welding the edges of the seam together to form a welded tube, a sizing section for sizing the welded tube, and a cut off section for cutting the sized tube to predetermined lengths, comprising:
    a programmable logic control (PLC) for receiving electronic data transmitted from input devices, and generating signals for transmission to output devices;
    means continuously measuring the width of said strip, located upstream of said forming section;
    said width-measuring means being electrically connected to said PLC and including means for transmitting said width measurements as electronic data, to said PLC;
    said PLC being programmed to store a set of threshold parameters for data received from said width-measuring means;
    said PLC being programmed to transmit an alarm signal when the measured width received from said width-measuring means exceeds the threshold parameters programmed into said PLC;
    alarm means responsive to an alarm signal from said PLC and being electrically connected to the PLC to receive electronic signals therefrom; and
    a control terminal electrically connected to said PLC, including means for programming variable parameters into said PLC.

2. The monitoring and control system of claim 1, wherein said alarm means includes a visual alarm for visually indicating the sensing of an alarm signal from the PLC.

3. The monitoring and control system of claim 1, wherein said alarm means includes an audio alarm for audibly indicating the sensing of an alarm signal from the PLC.

4. The monitoring and control system of claim 1, wherein said alarm means includes a visual and audio alarm for both visually and audibly indicating the sensing of an alarm signal from the PLC.

5. The monitoring and control system of claim 1, further comprising an override switch operably mounted on said control terminal and operable between "on" and "off" positions, said override switch electrically connected to said PLC to prevent transmission of an alarm signal to said alarm means when the switch is moved to the "on" position.

6. The monitoring and control system of claim 5, wherein said forming and sizing sections of the tube mill include drive apparatus for moving the strip through the tube mill, and wherein:

said mill drive apparatus is electrically connected to said PLC and selectively operable to a "stopped" condition preventing movement of the strip through the tube mill, in response to receipt of a "stop" signal from said PLC; and said PLC programmed to transmit a "stop" signal to said mill drive apparatus in response to the transmission of an "alarm" signal for a predetermined period of time without activation of the override switch to the "on" position.

7. The monitoring and control system of claim 1, further comprising:

means for tracking the position of said strip moving through said tube mill, electrically connected to said PLC;

said tracking means including means for transmitting electronic positional data to said PLC; and said PLC programmed to associate said positional data with the occurrence of an alarm signal, and to generate a tracking signal identifying the location on the strip which triggered the alarm signal.

8. The monitoring and control system of claim 7, further comprising means for visually marking said welded tube, located downstream of said sizing section and upstream of said cut off section;

said tube marking means electrically connected to said PLC in responsive to a marking signal to mark said tube; and said PLC programmed to transmit a marking signal to said marking means in response to the generation of said tracking signal.

9. The monitoring and control system of claim 1, wherein said mill cut off section is electrically connected to said PLC and selectively operable in response to a "cut" signal from said PLC;

said PLC programmed to transmit a "cut" signal to said mill cut off section in response to the generation of said tracking signal.

10. The monitoring and control system of claim 9, wherein said PLC includes means for determining an effective length of pipe which includes "unacceptable" sections identified as outside threshold parameters, and includes means for comparing the determined effective length with the predetermined lengths of said cut off tubes, and for generating a "cut" signal to cut tubes having "unacceptable" sections to a different length than the predetermined cut off tube lengths.

11. The monitoring and control system of claim 1, wherein said tube mill further includes a dump table section downstream of said mill cut off section, said dump table section including means for receiving and storing cut off tubes;

said means for receiving and storing cut off tubes including:

a first storage rack for storing "acceptable" cut off tubes;

a second storage rack for storing "unacceptable" cut off tubes; and sorting means for directing cut off tubes to said first and second racks;

said sorting means electrically connected to said PLC and operable between a first position directing tubes to the first rack, and a second position directing tubes to the second rack;

said sorting means responsive to a "dump" signal from the PLC to operate the sorting means to the second position; and said PLC programmed to transmit a "dump" signal to said sorting means in response to the generation of said tracking signal.

12. A monitoring and control system for a tube mill capable of converting a flat metal strip to round tubing, said tube mill including a forming section which forms the flat strip into an open seam tube, a welding section including welding apparatus with means for welding the edges of the seam together at a weld site to form a welded tube, a sizing section for sizing the welded tube, and a cut off section for cutting the sized tube to predetermined lengths, comprising:

a programmable logic control (PLC) for receiving electronic data transmitted from input devices, and generating signals for transmission to output devices;

means for continuously measuring the width of said strip, electrically connected to said PLC and located upstream of said forming section;

said width measuring means including means for transmitting said measurements as electronic data to said PLC;

means for continuously measuring the temperature of said weld at the weld site, electrically connected to said PLC;

said temperature measuring means including means for transmitting said measurements as electronic data to said PLC;

said PLC being programmed to store a first set of threshold parameters for data received from said width measuring means, and a second set of threshold parameters for data received from said temperature measuring means;

said PLC being programmed to transmit a first alarm signal to an alarm means, when the measured width received from said width measuring means exceeds the first set of threshold parameters;

said PLC being programmed to transmit a second alarm signal to said alarm means, when the measured temperature received from the temperature measuring means exceeds the second set of threshold parameters;

said alarm means responsive to said first and second alarm signals, electrically connected to the PLC; and a control terminal electrically connected to said PLC, including means for programming variable parameters into said PLC.

13. The monitoring and control system of claim 12, wherein said alarm means includes:

an audio alarm for audibly indicating the receipt of an alarm signal from the PLC; and a visual alarm for visually indicating the receipt of an alarm signal from the PLC.

14. The monitoring and control system of claim 13, wherein said visual alarm includes:

a first visual indicator responsive only to the first alarm signal; and a separate, second visual indicator responsive only to the second alarm signal.

15. The monitoring and control system of claim 14, wherein:

said PLC is programmed to store a first set of trend line parameters for data received from said width measuring means;

said PLC is programmed to store a second set of trend line parameters for data received from said temperature measuring means;

said trend line parameters having a range less than said threshold parameters;

said PLC programmed to transmit a first trend line alarm signal to said alarm means, when the measured width received from said width measuring means exceeds the first set of trend line parameters, but does not exceed the first set of threshold parameters;

said PLC programmed to transmit a second trend line alarm signal to said alarm means, when the temperature measurement received from said temperature measuring means exceeds the second set of trend line parameters, but does not exceed the second set of threshold parameters;

said alarm means being responsive to both trend line alarm signals and threshold alarm signals;

said visual alarm including a first means for responding to a trend line alarm signal and a second means for responding to threshold alarm signal, said first and second responding means being visually distinct.

16. The monitoring and control system of claim 13, further comprising:

eddy-current testing apparatus operably mounted to test the conductance of said welded tube and generate tests data in response thereto, located downstream of said welding section;

said testing apparatus electrically connected to said PLC, and including means for transmitting said tests data as electronic data to said PLC;

said PLC programmed to store a third set of threshold parameters for data received from said testing apparatus;

said PLC programmed to transmit a third alarm signal to said alarm means, when the test data from the testing apparatus exceeds the third set of threshold parameters;

said alarm means being responsive to said third alarm signals.

17. The monitoring and control system of claim 16, wherein said visual alarm further includes a separate, third visual indicator responsive only to the third alarm signal.

18. A method for continuously monitoring the weld quality of an electric resistance welded tube during the manufacture thereof, the manufacture of the welded tube including the steps of forming a flat metal strip into an open seam tube, welding the edges of the open seam together at a weld site to form a welded tube, sizing the welded tube, and cutting the sized welded tube to predetermined lengths, comprising the steps of:

providing a programmable logic control (PLC) for receiving electronic data and generating signals in response to the received electronic data;

continuously measuring the width of said strip prior to the forming step;

transmitting the width measurements to the PLC;

said PLC comparing the transmitted width measurements with a set of programmed threshold width parameters;

continuously measuring the temperature of the weld at the weld site;

transmitting the temperature measurements to the PLC;

said PLC comparing the transmitted temperature measurements with a set of programmed threshold temperature parameters;

said PLC transmitting an alarm signal to an alarm when the width measurements exceed the width parameters;

said PLC transmitting an alarm signal to said alarm when the measured temperature exceeds the threshold temperature parameters;

activating said alarm in response to a transmitted alarm signal.

19. A monitoring and control system for a tube mill capable of converting a flat metal strip to round tubing, said tube mill including a forming section which forms the flat strip into an open seam tube, a welding section for welding the edges of the seam together to form a welded tube, a sizing section for sizing the welded tube, and a cut off section for cutting the sized tube to predetermined lengths, comprising:

a programmable logic control (PLC) for receiving electronic data transmitted from input devices, and generating signals for transmission to output devices;

said welding section including welding apparatus with means for welding the edges of the open seam tube together at a weld site;

means for continuously measuring the temperature of the weld at the weld site;

said temperature measuring means being electrically connected to the PLC and including means for transmitting said temperature measurement as electronic data, to said PLC:

said PLC being programmed to store a set of threshold parameters for data received from said temperature measuring means;

said PLC being programmed to transmit an alarm signal when the measured temperature received from said temperature measuring means exceeds the threshold parameters programmed into said PLC;

alarm means responsive to an alarm signal from said PLC and being electrically connected to the PLC to receive electronic signals therefrom;

a control terminal electrically connected to said PLC, including means for programming variable parameters into said PLC;

means for tracking the position of said strip moving through said tube mill, electrically connected to said PLC;

said tracking means including means for transmitting electronic positional data to said PLC;

said PLC programmed to associate said positional data with the occurrence of an alarm signal, and to generate a tracking signal identifying the location on the strip which triggered the alarm signal;

said mill cut off section being electrically connected to said PLC and selectively operable in response to a "cut" signal from said PLC; and said PLC being programmed to transmit a "cut" signal to said mill cut off section in response to the generation of said tracking signal.

20. The monitoring and control system of claim 19, wherein said PLC includes means for determining an effective length of pipe which includes "unacceptable" sections identified as outside threshold parameters, and includes means for comparing the determined effective length with the predetermined lengths of said cut off tubes, and for generating a "cut" signal to cut tubes having "unacceptable" sections to a different length than the predetermined cut off tube lengths.

21. A monitoring and control system for a tube mill capable of converting a flat metal strip to round tubing, said tube mill including a forming section which forms the flat strip into an open seam tube, a welding section for welding the edges of the seam together to form a welded tube, a sizing section for sizing the welded tube, and a cut off section for cutting the sized tube to predetermined lengths, comprising:

- a programmable logic control (PLC) for receiving electronic data transmitted from input devices, and generating signals for transmission to output devices;
- said welding section including welding apparatus with means for welding the edges of the open seam tube together at a weld site;
- means for continuously measuring the temperature of the weld at the weld site;
- said temperature measuring means being electrically connected to the PLC and including means for transmitting said temperature measurement as electronic data, to said PLC:
- said PLC being programmed to store a set of threshold parameters for data received from said temperature measuring means;
- said PLC being programmed to transmit an alarm signal when the measured temperature received from said temperature measuring means exceeds the threshold parameters programmed into said PLC;
- alarm means responsive to an alarm signal from said PLC and being electrically connected to the PLC to receive electronic signals therefrom;
- a control terminal electrically connected to said PLC, including means for programming variable parameters into said PLC;
- means for tracking the position of said strip moving through said tube mill, electrically connected to said PLC;
- said tracking means including means for transmitting electronic positional data to said PLC;
- said PLC programmed to associate said position data with the occurrence of an alarm signal, and to generate a tracking signal identifying the location on the strip which triggered the alarm signal;
- a dump table section downstream of said mill cut off section, said dump table section including means for receiving and storing cut off tubes;
- said means for receiving and storing cut off tubes including:
  - a first storage rack for storing "acceptable" cut off tubes;
  - a second storage rack for storing "unacceptable" cut off tubes; and
  - sorting means for directing cut off tubes to said first and second racks;
- said sorting means electrically connected to said PLC and operable between a first position directing tubes to the first rack, and a second position directing tubes to the second rack;
- said sorting means responsive to a "dump" signal from the PLC to operate the sorting means to the second position; and
- said PLC programmed to transmit a "dump" signal to said sorting means in response to the generation of said tracking signal.

* * * * *